US011522568B2

(12) United States Patent
Lidian et al.

(10) Patent No.: US 11,522,568 B2
(45) Date of Patent: Dec. 6, 2022

(54) IDENTIFICATION OF LOW PERFORMING RADIO BRANCH

(71) Applicant: Telefonaktiebolaget LM Ericsson (publ), Stockholm (SE)

(72) Inventors: Namir Lidian, Solna (SE); Bo Göransson, Sollentuna (SE); Erik Larsson, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/977,087

(22) PCT Filed: Mar. 29, 2018

(86) PCT No.: PCT/SE2018/050345
§ 371 (c)(1),
(2) Date: Aug. 31, 2020

(87) PCT Pub. No.: WO2019/190371
PCT Pub. Date: Oct. 3, 2019

(65) Prior Publication Data
US 2020/0403650 A1 Dec. 24, 2020

(51) Int. Cl.
*H04B 1/04* (2006.01)
*H04B 17/14* (2015.01)
(Continued)

(52) U.S. Cl.
CPC ........... *H04B 1/0466* (2013.01); *H01Q 3/267* (2013.01); *H04B 7/046* (2013.01); *H04B 7/0617* (2013.01);
(Continued)

(58) Field of Classification Search
CPC .................................................. H04B 1/0466
(Continued)

(56) References Cited

U.S. PATENT DOCUMENTS 5,809,019 A * 9/1998 Ichihara ............... H04B 7/0619
375/267
8,843,463 B2 * 9/2014 Moritz .................... H04L 67/02
707/705
(Continued)

FOREIGN PATENT DOCUMENTS

CN 106489242 A 3/2017
CN 107624225 A 1/2018
(Continued)

OTHER PUBLICATIONS

International Search Report and Written Opinion for International Application No. PCT/SE2018/050345, dated Jan. 21, 2019, 23 pages.
Xu et al., "Full Dimension Mimo (FD-MIMO)—Reduced complexity system design and real-time implementation," 2016, pp. 279-284, 2016 IEEE International Workshop on Signal Processing Systems.
(Continued)

*Primary Examiner* — Lihong Yu
(74) *Attorney, Agent, or Firm* — Nicholson De Vos Wesbter & Elliott LLP

(57) ABSTRACT

A mechanism for identifying a low performing radio branch at a radio transceiver device. A method is performed by the radio transceiver device that comprises transmitting a reference signal for at least some of the N radio branches in a respective test period. The reference signal in each test period is transmitted according to a test configuration that specifies that during each test period the reference signal is mapped to only one of the N radio branches such that in test period k, where k=1, . . . , N, the reference signal is only transmitted from radio branch k. The method comprises receiving at least one report from another radio transceiver device relating to measurements made by this so-called another radio transceiver device on the reference signal transmitted for these at least some of the N radio branches to identify which of the N radio branches is the low performing one.

20 Claims, 6 Drawing Sheets

(51) Int. Cl.
  *H04B 17/17* (2015.01)
  *H04B 17/29* (2015.01)
  *H01Q 3/26* (2006.01)
  *H04B 7/0456* (2017.01)
  *H04B 7/06* (2006.01)
  *H04B 17/00* (2015.01)

(52) U.S. Cl.
  CPC ......... *H04B 17/0085* (2013.01); *H04B 17/14* (2015.01); *H04B 17/17* (2015.01); *H04B 17/29* (2015.01)

(58) Field of Classification Search
  USPC .......................................... 375/262
  See application file for complete search history.

(56) References Cited

U.S. PATENT DOCUMENTS

| | | | |
|---|---|---|---|
| 2006/0023803 A1 | 2/2006 | Perlman et al. | |
| 2010/0123471 A1* | 5/2010 | Olgaard | H04L 1/243 324/750.3 |
| 2013/0250781 A1* | 9/2013 | Gilmartin | H04B 17/20 370/250 |
| 2014/0140293 A1* | 5/2014 | Sharma | H04L 5/001 370/329 |
| 2015/0333884 A1* | 11/2015 | Athley | H04B 7/0617 375/295 |
| 2016/0227425 A1* | 8/2016 | Kim | H04L 5/0007 |
| 2017/0134130 A1* | 5/2017 | Li | H04W 72/1273 |
| 2018/0040964 A1 | 2/2018 | Benjebbour et al. | |
| 2018/0048361 A1 | 2/2018 | Kundargi et al. | |
| 2019/0069218 A1* | 2/2019 | Ribeiro | H04W 48/10 |

FOREIGN PATENT DOCUMENTS

| | | |
|---|---|---|
| GB | 2500409 A | 9/2013 |
| WO | 2018156061 A1 | 8/2018 |

OTHER PUBLICATIONS

Luo, "Online Compressive Diagnosis of Massive MIMO Calibration State," Dec. 2017, pp. 666-677, Journal of Communications and Networks, vol. 19, No. 6.
3GPP TS 36.214 V14.2.0, "3rd Generation Partnership Project; Technical Specification Group Radio Access Network; Evolved Universal Terrestrial Radio Access (E-UTRA); Physical layer; Measurements (Release 14)," Mar. 2017, 22 pages, 3GPP Organizational Partners.
3GPP TS 36.331 V14.3.0, "3rd Generation Partnership Project; Technical Specification Group Radio Access Network; Evolved Universal Terrestrial Radio Access (E-UTRA); Radio Resource Control (RRC); Protocol specification (Release 14)," Jun. 2017, 745 pages, 3GPP Organizational Partners.
3GPP TR 38.802 V14.1.0, "3rd Generation Partnership Project; Technical Specification Group Radio Access Network; Study on New Radio Access Technology Physical Layer Aspects (Release 14)," Jun. 2017, 144 pages, 3GPP Organizational Partners.
3GPP TR 38.912 V14.0.0, "3rd Generation Partnership Project; Technical Specification Group Radio Access Network; Study on New Radio (NR) access technology (Release 14)," Mar. 2017, 74 pages, 3GPP Organizational Partners.
Invitation to Pay Additional Fees for International Application No. PCT/SE2018/050345, dated Nov. 28, 2018, 17 pages.
International Preliminary Report on Patentability for International Application No. PCT/SE2018/050345, dated Oct. 8, 2020, 18 pages.
First Office Action and Search Report, CN App. No. 201880092078.7, dated Mar. 3, 2022, 24 pages (13 pages of English Translation and 11 pages of Original Document).
Communication pursuant to Article 94(3) EPC, EP App. No. 18716688.9, dated Aug. 9, 2022, 10 pages.
Notification to Grant, CN App. No. 201880092078.7, dated Oct. 27, 2022, 3 pages (2 pages of English Translation and 1 page of Original Document).

* cited by examiner

IDENTIFICATION OF LOW PERFORMING RADIO BRANCH

CROSS-REFERENCE TO RELATED APPLICATIONS

This application is a National stage of International Application No. PCT/SE2018/050345, filed Mar. 29, 2018, which is hereby incorporated by reference.

TECHNICAL FIELD

Embodiments presented herein relate to a method, a radio transceiver device, a computer program, and a computer program product for identifying a low performing radio branch at the radio transceiver device.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is the ability to detect and handle faulty equipment. Compared to a traditional radio unit (RU) deployment with few antenna branches, this issue becomes more difficult to handle for Advanced Antenna Systems (AAS) with large antenna arrays.

In general terms, AAS has the potential to significantly increase the network capacity and enhance end-user perception compared to traditional RUs by facilitating efficient use of advanced spatial-processing techniques such as multi-user multiple input multiple output (MU-MIMO) and beamforming. AAS can be defined in many ways, but can, in general, be said to facilitate efficient alternatives to map communication resources into space according to dynamic needs. The performance of an AAS depends on many characteristics, such as the antenna array design, implementation aspects, configured software features and deployment scenarios. One attribute of an AAS is the number of supported antenna ports, or radio chains. This describes, among other, the degree of digitally beamforming, i.e. essentially how many different signals that can be fed to the antenna system with individual complex weighting.

One challenge for mobile network operators is to maintain a certain quality of service for the traffic in the network, for example to provide network access without service interruption. The mobile network operators might therefore monitor certain Key Performance Indicators (KPIs) in the network. The mobile network operators might therefore monitor network interfaces such as the air interface and the core network interface, check the KPIs and perform necessary configurations and re-configurations in the network in order to maintain the certain quality of service. Mobile network operators seek to utilize available radio resources as efficiently as possible and therefore try to, if possible, avoid switching off radio branches since this might cause services to be rendered unavailable, thus resulting in network interruptions. However, if some component of the radio circuitry in the network equipment is faulty, it could be beneficial to switch off the radio branch associated with this component, instead of switching off the complete radio circuitry, since switching off the complete radio circuitry would negatively affect the network KPIs. Switching off the radio branch associated with the faulty component might only impact the network KPIs minimally.

Similarly, if a radio branch experience a radio propagation channel suffering from deep fading, it might not be efficient to transmit a signal over this radio branch. For a communications network where users are moving it might be unlikely that a radio branch is in a state of deep fading for a substantial amount of time. But for static applications such as fixed wireless access (FWA) and for back/front-haul application it is not unlikely that the fading is fairly constant during a substantial amount of time.

Radio transceiver devices for so-called massive multiple input multiple output (MIMO) systems generally comprise a large amount of radio branches. One issue with radio transceiver devices for massive MIMO systems is that it might be difficult to detect if one radio branch is faulty or experiences deep fading. In more detail, since many radio branches are simultaneously active to generate the transmitted signal, each radio branch is only contributing with a small part of the total signal. It might, however, be a significant saving in e.g. power consumption, if radio branches not contributing to the overall performance could be switched off. It could also be beneficial if a broken radio chain could be reported to a management system. By judging the amount of broken components, appropriate alarms could be set and actions might be taken, depending on what and how the broken components impact the network KPIs.

One possible way to detect a faulty radio branch in a radio transceiver device would be to have sensors monitoring the performance of the different parts of the transmit radio chains and/or the receive radio chains. This would, however, increase the hardware cost needed for radio performance supervision, and also make the design more difficult since there must be enough space for the sensors in the radio transceiver device. Further, having such sensors might still not allow a radio branch suffering from deep fading to be identified.

Hence, there is still a need for an improved detection and identification of low performing radio branches at a radio transceiver device.

SUMMARY

An object of embodiments herein is to provide mechanisms for efficient identification of low performing radio branches at a radio transceiver device.

According to a first aspect there is presented a method for identifying a low performing radio branch at a radio transceiver device. The radio transceiver device comprises $N>1$ radio branches. The method is performed by the radio transceiver device. The method comprises transmitting a reference signal for at least some of the N radio branches in a respective test period. The reference signal in each test period is transmitted according to a test configuration. The test configuration specifies that during each test period the reference signal is mapped to only one of the N radio branches such that in test period k, where $k=1, \ldots, N$, the reference signal is only transmitted from radio branch k. The method comprises receiving at least one report from another radio transceiver device relating to measurements made by this so-called another radio transceiver device on the reference signal transmitted for these at least some of the N radio branches. The method comprises identifying which of the N radio branches is the low performing one by mapping information of the measurements in the at least one received report to the test configuration.

According to a second aspect there is presented a radio transceiver device for identifying a low performing radio branch at the radio transceiver device. The radio transceiver device comprises N>1 radio branches. The radio transceiver device further comprises processing circuitry. The processing circuitry is configured to cause the radio transceiver device to transmit a reference signal for at least some of the N radio branches in a respective test period. The reference signal in each test period is transmitted according to a test configuration. The test configuration specifies that during each test period the reference signal is mapped to only one of the N radio branches such that in test period k, where k=1, . . . , N, the reference signal is only transmitted from radio branch k. The processing circuitry is configured to cause the radio transceiver device to receive at least one report from another radio transceiver device relating to measurements made by this so-called another radio transceiver device on the reference signal transmitted for these at least some of the N radio branches. The processing circuitry is configured to cause the radio transceiver device to identify which of the N radio branches is the low performing one by mapping information of the measurements in the at least one received report to the test configuration.

According to a third aspect there is presented a radio transceiver device for identifying a low performing radio branch at a radio transceiver device. The radio transceiver device comprises N>1 radio branches. The radio transceiver device further comprises a transmit module configured to transmit a reference signal for at least some of the N radio branches in a respective test period. The reference signal in each test period is transmitted according to a test configuration. The test configuration specifies that during each test period the reference signal is mapped to only one of the N radio branches such that in test period k, where k=1, . . . , N, the reference signal is only transmitted from radio branch k. The radio transceiver device further comprises a receive module configured to receive at least one report from another radio transceiver device relating to measurements made by this so-called another radio transceiver device on the reference signal transmitted for these at least some of the N radio branches. The radio transceiver device further comprises an identify module configured to identify which of the N radio branches is the low performing one by mapping information of the measurements in the at least one received report to the test configuration.

Advantageously this provides efficient identification of low performing radio branches at the radio transceiver device.

Advantageously this enables optimal utilization of the radio branches and antenna elements to minimize impact on KPIs associated with the air interface.

Advantageously, at relatively low signal to interference plus noise ratios (SINRs), for example at the cell edge or at high system load, this will improve the overall system coverage and capacity.

Advantageously this enables identification of faulty radio branches, which in turn facilitates the possibility to compensate faults by, for example, adapting parameters to new conditions, and hence increased performance. As an example, by proper adaptation the MIMO rank might be kept even where a radio branch is identified as faulty and switched off.

Advantageously this method does not require any additional hardware, such as sensors, which means a cost reduction compared to the traditional solution which has special hardware for radio performance supervision.

According to a fourth aspect there is presented a computer program for identifying a low performing radio branch at the radio transceiver device, the computer program comprising computer program code which, when run on the radio transceiver device, causes the radio transceiver device to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
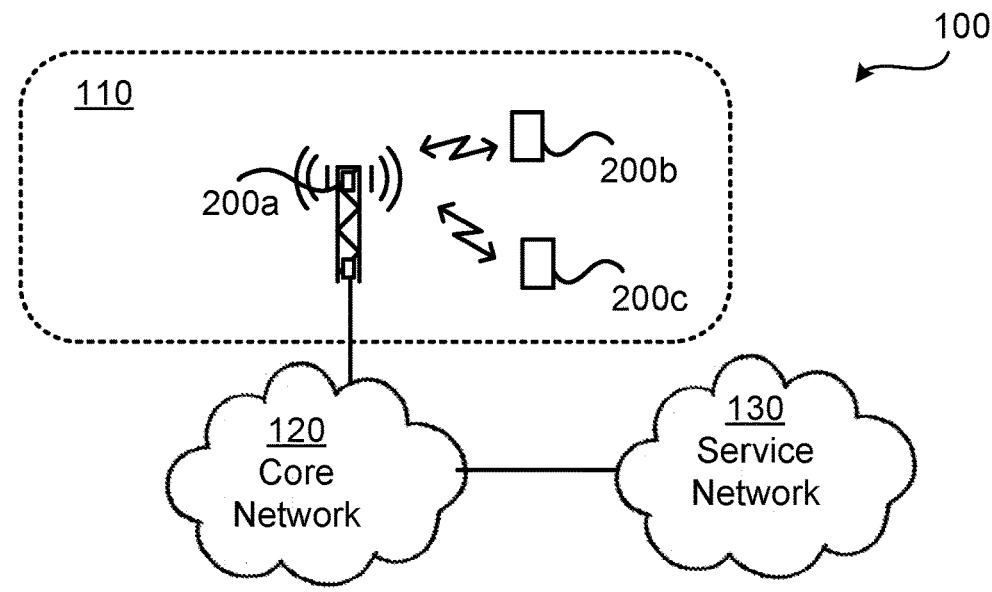
FIG. 1 is a schematic diagram illustrating a communications network according to embodiments.

FIG. 1 is a schematic diagram illustrating a communications network 100 where embodiments presented herein can be applied. The communications network 100a could be a third generation (3G) telecommunications network, a fourth generation (4G) telecommunications network, or a fifth (5G)

telecommunications network and support any 3GPP telecommunications standard, where applicable.

The communications network 100 comprises a radio transceiver device 200a configured to provide network access over one or more radio propagation channels to other radio transceiver devices 200b, 200c in a radio access network 110. In some embodiments the radio transceiver devices 200b, 200c are part of, integrated with, or collocated with, respective terminal devices and the radio transceiver device 200a is part of, integrated with, or collocated with, a network node.

Radio access network 110 is operatively connected to a core network 120. The core network 120 is in turn operatively connected to a service network 130, such as the Internet. The radio transceiver devices 200b, 200c are thereby, via the radio transceiver device 200a, enabled to access services of, and exchange data with, the service network 130.

Examples of network nodes are radio access network nodes, radio base stations, base transceiver stations, Node Bs, evolved Node Bs, g Node Bs, access points, access nodes, and backhaul nodes. Examples of terminal devices are wireless devices, mobile stations, mobile phones, handsets, wireless local loop phones, user equipment (UE), smartphones, laptop computers, tablet computers, network equipped sensors, network equipped vehicles, and so-called Internet of Things devices.

The herein disclosed embodiments can be applied at a radio transceiver device 200a implemented both in a radio access network nodes and in terminal devices, or even as radio transceiver devices implemented as backhauling nodes or a sidelink nodes. Thus, although radio transceiver device 200a in at least some of the herein disclosed embodiments is described as being a network node and radio transceiver devices 200b, 200c are described as being terminal devices, the functionality of the herein disclosed radio transceiver device 200a could equally be implemented in a terminal device, and vice versa for the radio transceiver devices 200b, 200c.

Figure 2:
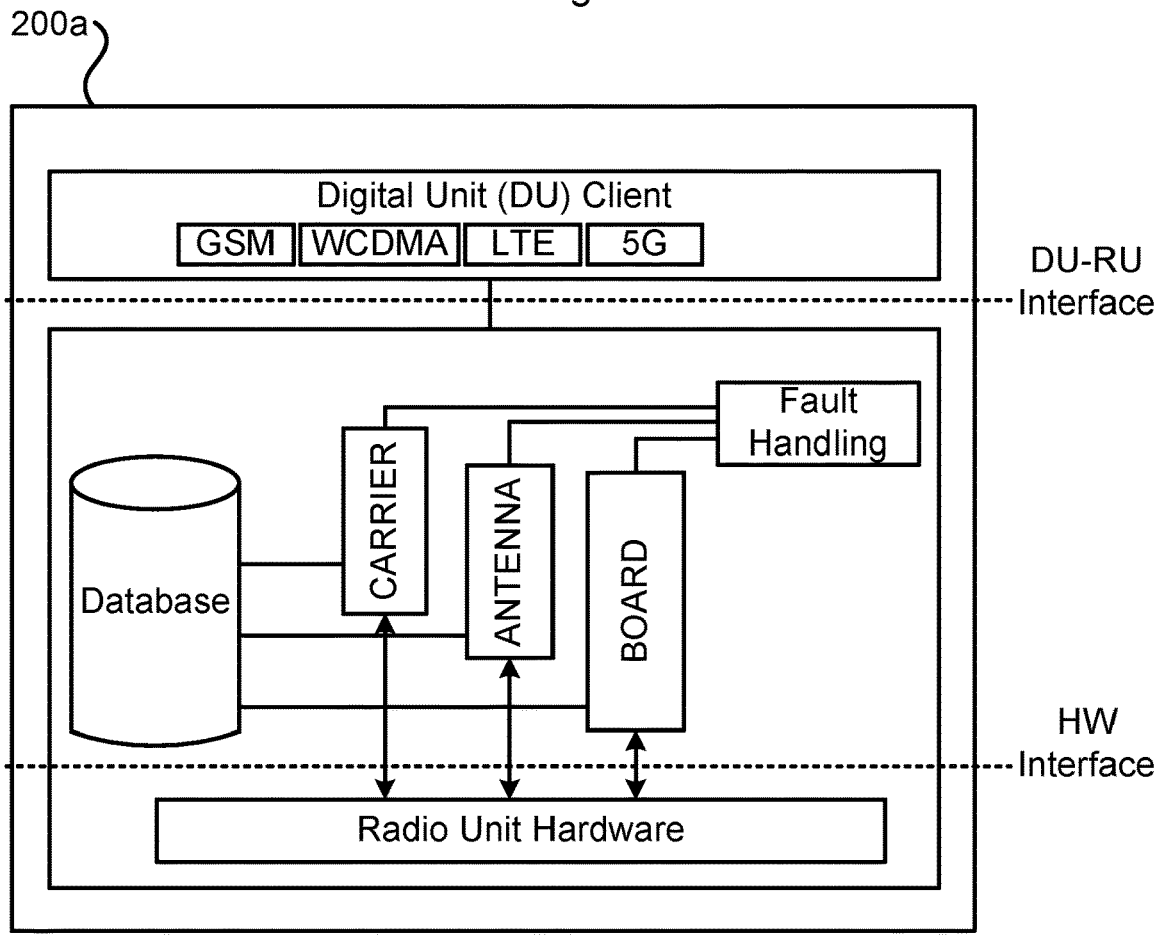
FIGS. 2, 3, 4, 6, and 7 schematically illustrate parts of a radio transceiver device according to embodiments.

FIG. 2 illustrates a general overview of the digital unit client and the radio unit function, database and radio unit hardware of the radio transceiver device 200a. The functionality of the radio unit is illustrated by means of an antenna module, a carrier module, a fault handling module, and a board module. The carrier module is configured for resource and capability handling and is configured for configuring and supervising the user plane data processing of a carrier of radio resources. The configuration of a carrier is based on the received configuration information from the Digital Unit. The antenna module is configured for the configuration, supervision tracing, tracing, testing and other functionalities of the Radio Unit. The board module is configured for operation and maintenance functions. The radio resources for carrier handling are modelled by user plane branches. The number of user plane branches per radio unit may vary depending on radio transceiver device 200a. The user plane branch is defined to extend between the radio frequency port (from/to antenna) and the data port (from/to Digital Unit) of the radio unit. That is, a user plane branch will see the antenna branch at one end (the hardware interface in FIG. 2) and a digital unit—radio unit interface, such as the Common Public Radio Interface (CPRI), branch at the other end (the DU-RU Interface in FIG. 2). On a high-level description each transmit radio branch comprises filters, digital to analog converters, analog radio frequency components, and a Digital Signaling Processor (DSP). Depending on the implementation, some components are common for all transmit radio branches. The processing within the filter typically comprises channel filtering, up-sampling and up-conversion. The up-converted data streams from the filter are summed together and processed by the DSP. The functionality within the DSP typically comprises carrier combining, crest factor reduction (CFR), up-sampling and digital pre-distortion (DPD). The output signal from the DPD is converted to an analog signal by the digital to analog converters and then up-converted to radio frequency. The analog radio frequency components are provided between the power amplifiers and the radio frequency ports. The analog radio frequency components are common for all transmit carriers and comprises radio frequency and intermediate frequency gain control and filtering, intermediate frequency to radio frequency up conversion. On a high-level description each receive radio branch comprises analog radio frequency components, an analog to digital converter and radio frequency filters. The analog radio frequency components define the receiver part between the radio frequency port and analog to digital converter. The receiver analog radio frequency components are common for all receive carriers and comprises radio frequency to intermediate frequency down conversion, radio frequency and intermediate frequency gain control and filtering. For reception, the data enters from the analog to digital converter into a receive branch. The receive branch processes data consisting of multiple carriers. The processing typically includes I/Q separation, coarse down conversion, filtering and initial down sampling. The output from the receive branch is I/Q data ready for final down conversion. The I/Q separated data from the receive branches might still comprise more than one carrier. The data enters into a number of UL filter branches. Each such branch typically performs final down conversion of one single carrier, down conversion and channel filtering.

Figure 3:
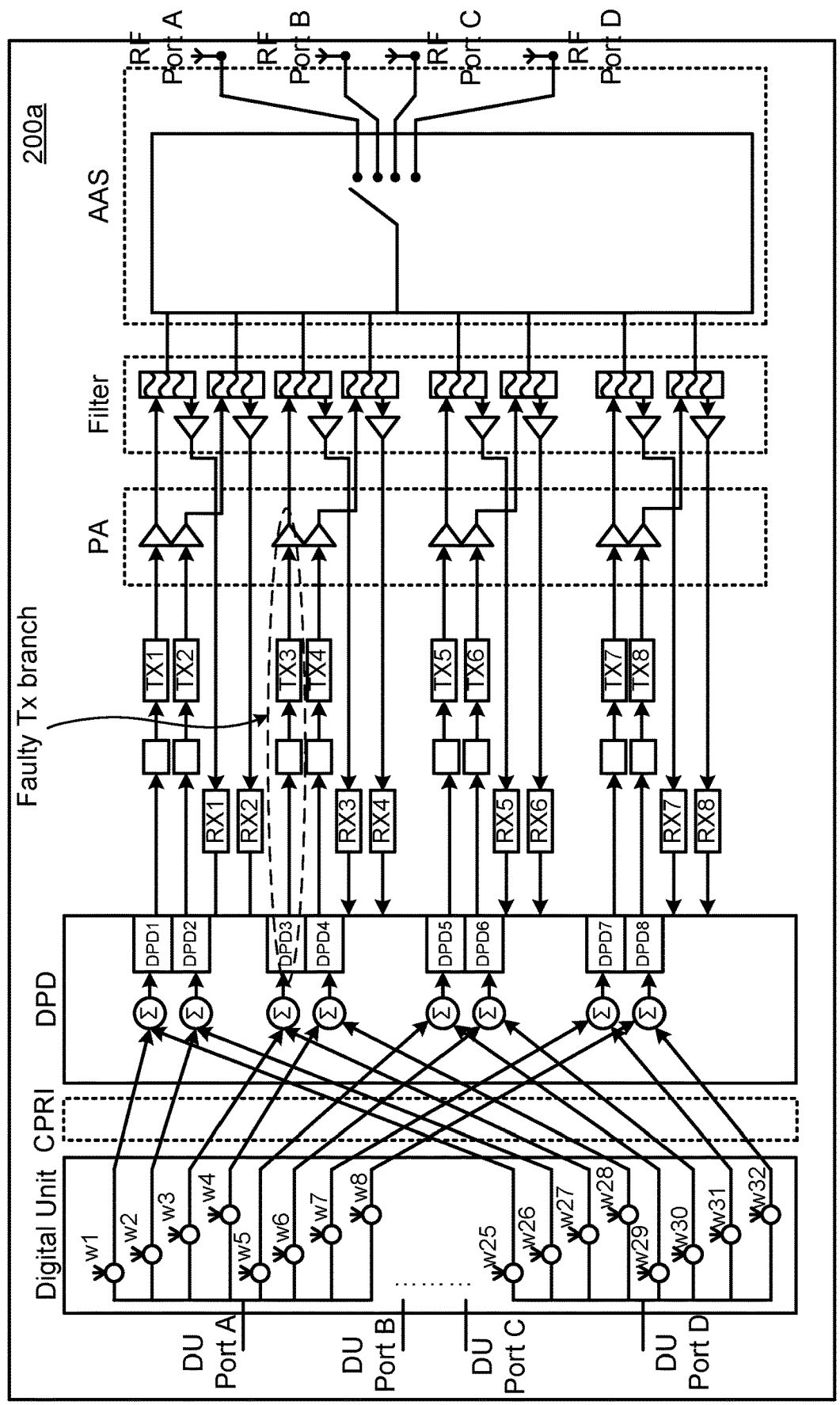

FIG. 3 schematically illustrates part of the transmitter and receiver of the radio transceiver device (comprising applying weight factors w1, w2, . . . , w32), digital pre-distorter (comprising digital pre-distorters DPD1, . . . , DPD8), radio branches (comprising transmit radio branches TX1, . . . , TX8, and receive radio branches RX1, . . . , RX8), power amplifiers, filters, and antenna arrangement (comprising a distribution network and antennas) defining an AAS along the way from digital unit ports DU Port A, . . . , DU Port D to antenna ports RF Port A, . . . , RF Port D. In the illustrative example of FIG. 3, the radio branch TX3 is assumed to be faulty.

Figure 4:
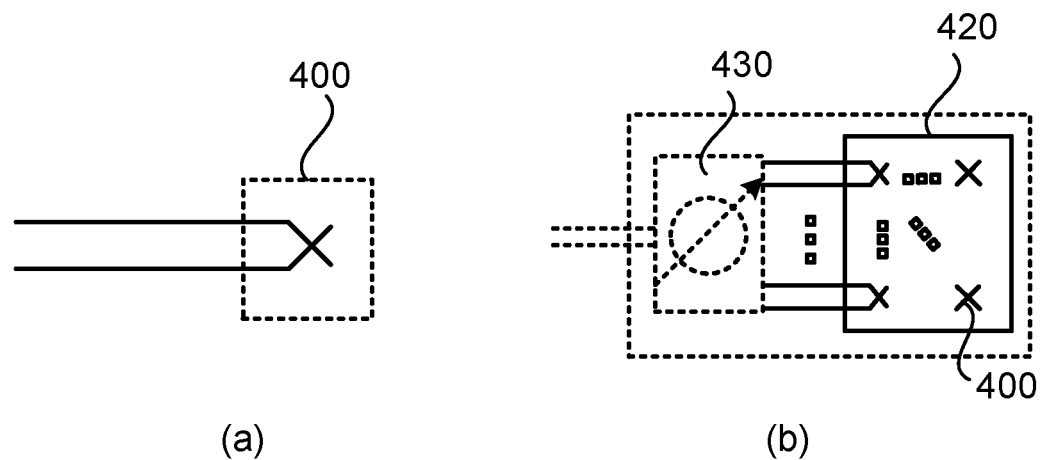
Figure 4:
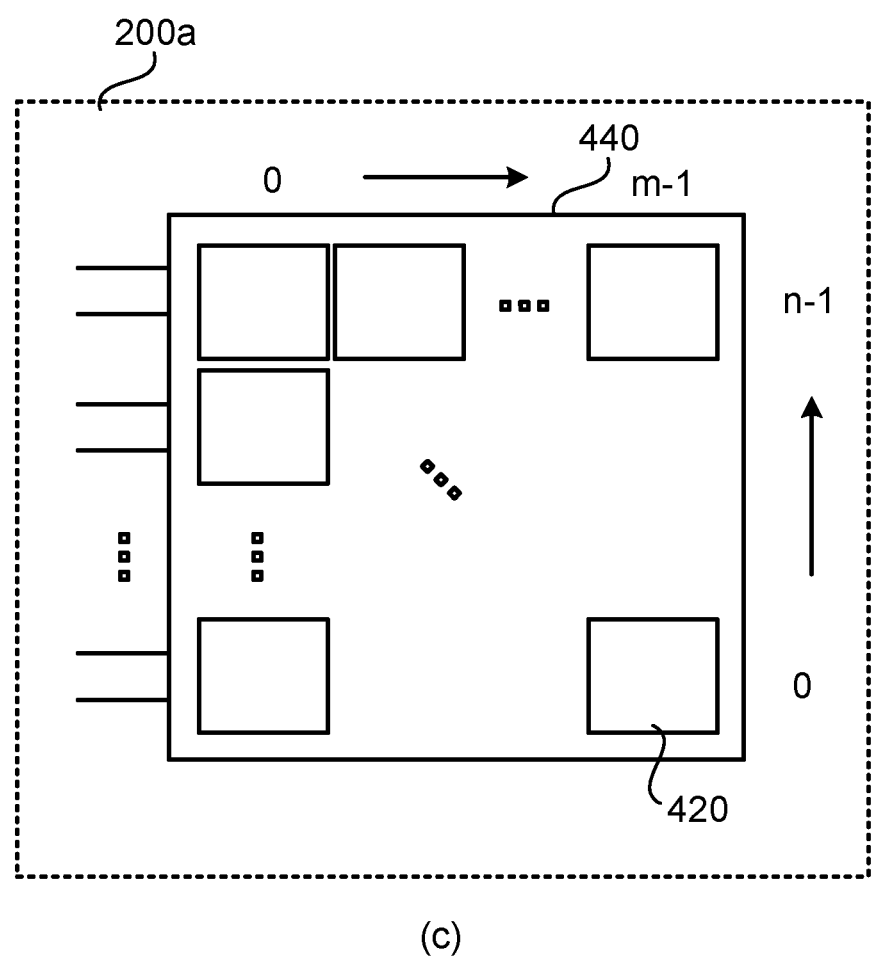

An AAS using dual polarized antenna elements as the basic building block is considered here for illustrative purposes. FIG. 4(a) schematically illustrates a single dual-polarized antenna element 400. Several of these dual polarized antenna elements could be combined into a subarray 420 comprising, or at least being co-located with, a distribution network 430, where each subarray has two input signals; one per polarization dimension, as schematically illustrated in FIG. 4(b). The combination of the antenna elements into subarrays can be done in many ways. For example, an analogue distribution network can be used, with or without remote electrical tilt (RET) functionality, or a fully flexible analogue beamforming network, where the excitation of each element can be independently tuned, can be envisioned. How the combination into subarray is done will affect the antenna radiation pattern that an input signal to the subarray generates. Multiple subarrays 420, could be combined into an antenna array 440 to complete the AAS of the radio transceiver device 200a, as schematically illustrated in FIG. 4(c) which illustrates an antenna arrangement 440 comprising n-by-m subarrays 420.

The tight integration of antenna unit and radio unit in AAS makes it challenging to isolate faults and typically gives a less robust building practice, and thus challenging to identify radio branch TX3 in FIG. 3 as faulty. In fact, it is often claimed that large-scale AAS can rely on the law of large numbers and thereby achieve similar or better performance than current antenna systems with relaxed radio implementation requirements and therefore cheaper and less robust components. Also, due to the law of diminishing returns, it is clear that the performance impact of one faulty antenna branch for a traditional small-scale (e.g. two or four antenna branches) antenna system is much more severe compared to one faulty antenna branch for a large-scale AAS (e.g., 64, 128, or even more antenna branches).

It is, in general, not feasible to label a large-scale AAS as completely faulty, or broken, and in need of replacement due to a single or few faulty radio branches. This will be too costly and too cumbersome; it is in many cases difficult to replace AAS components at site. Still, it is important to ensure that performance is kept sufficiently good (as good as possible) all the time, even though there is a faulty component in one or more of the radio branches. Existing fault handling mechanisms do not include any tailored solutions for handling this issue.

The embodiments disclosed herein therefore relate to mechanisms for identifying a low performing radio branch at the radio transceiver device 200a. In order to obtain such mechanisms there is provided a radio transceiver device 200a, a method performed by the radio transceiver device 200a, a computer program product comprising code, for example in the form of a computer program, that when run on a radio transceiver device 200a, causes the radio transceiver device 200a to perform the method.

Figure 5:
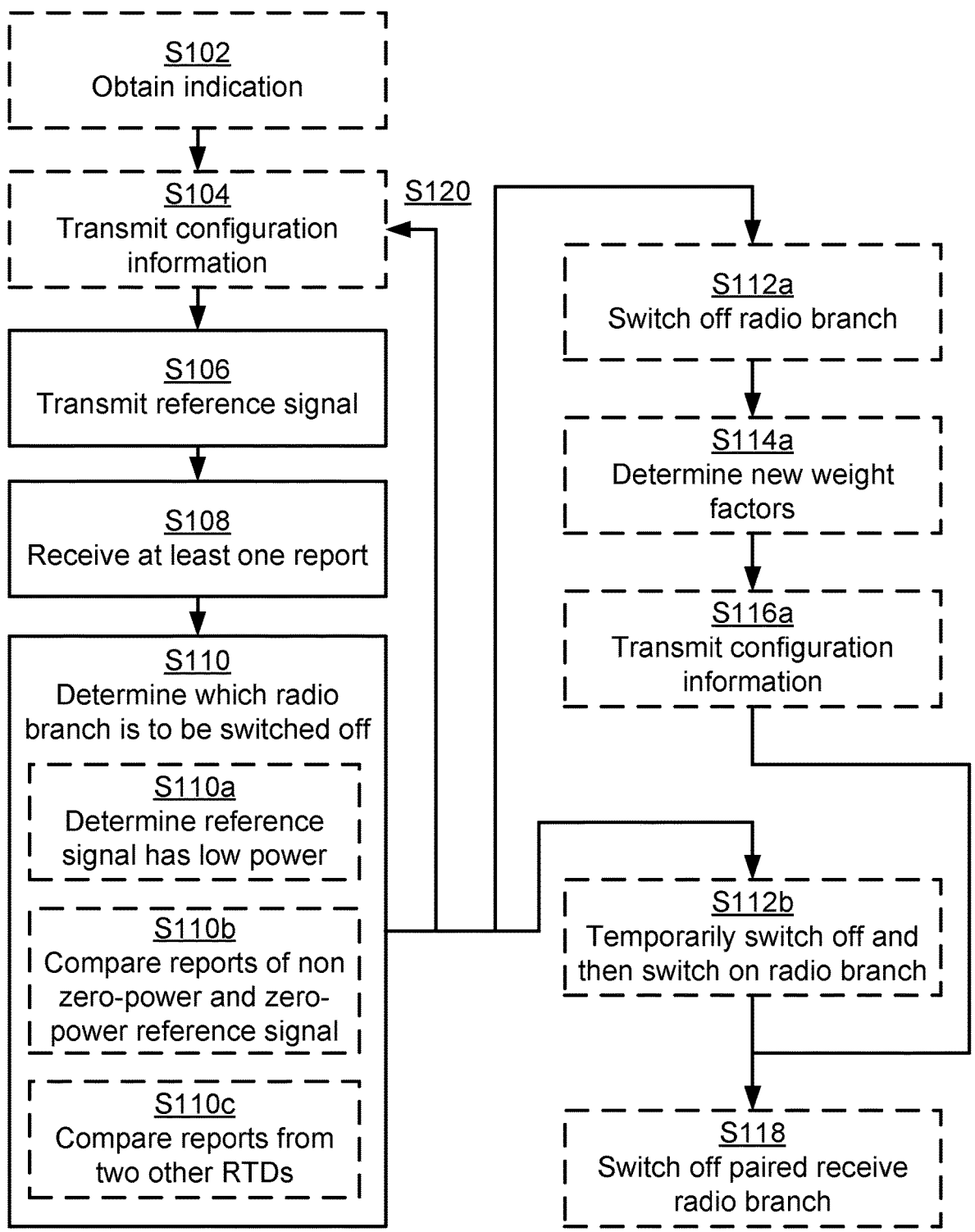
FIG. 5 is a flowchart of methods according to embodiments.

FIG. 5 is a flowchart illustrating embodiments of methods for identifying a low performing radio branch at the radio transceiver device 200a comprising N>1 radio branches. The methods are performed by the radio transceiver device 200a. The methods are advantageously provided as computer programs 1020.

The radio transceiver device 200a might configure another radio transceiver device 200b to provide reports of Channel State Information (CSI), such as instantaneous downlink channel quality, to the radio transceiver device 200a. The channel state information is usually obtained by the radio transceiver device 200b measuring on reference signals transmitted by the radio transceiver device 200a. Hence, the radio transceiver device 200a is configured to perform step S106:

S106: The radio transceiver device 200a transmits a reference signal for at least some of the N radio branches in a respective test period. The reference signal in each test period is transmitted according to a test configuration. The test configuration specifies that during each test period the reference signal is mapped to only one of the N radio branches such that in test period k, where k=1, . . . , N, the reference signal is only transmitted from radio branch k.

The so-called another radio transceiver device 200b is assumed to receive the reference signal and report back its quality to the radio transceiver device 200a. Hence, the radio transceiver device 200a is configured to perform step S108:

S108: The radio transceiver device 200a receives at least one report from another radio transceiver device 200b relating to measurements made by the so-called another radio transceiver device 200b on the reference signal transmitted for these at least some of the N radio branches.

This report, together with the scheme as according to which the reference signal is transmitted, enables the radio transceiver device 200a to identify the low performing radio branch. Hence, the radio transceiver device 200a is configured to perform step S110:

S110: The radio transceiver device 200a identifies which of the N radio branches is the low performing one by mapping information of the measurements in the at least one received report to the test configuration.

Embodiments relating to further details of identifying a low performing radio branch at the radio transceiver device 200a as performed by the radio transceiver device 200a will now be disclosed.

There may be different ways for the radio transceiver device 200a to transmit the reference signal.

In some aspects the reference signal is transmitted from one radio branch at the time. That is, according to an embodiment only one single reference signal is transmitted during each test period.

In some aspects there are several simultaneous transmissions of respective reference signals from different radio branches. That is, according to an embodiment there are simultaneous transmissions of more than one reference signal, each of which being mapped to a corresponding one of the radio branches. In some aspects each reference signal is transmitted in its own frequency sub-band. The different sub-bands are thus associated with different radio branches. This enables the use of frequency-selective channel quality indicator (CQI) measurements. This would mean that the radio transceiver device 200a would obtain relative estimates of the quality of different radio branches in one report. This could be advantageous if the measurements are performed in environments where the radio propagation channel is not frequency-selective, e.g. for line-of-sight conditions between the radio transceiver devices 200a, 200b, since then both short-term and long-term channel conditions should be very similar for all reports.

There might be different triggers for the radio transceiver device 200a to test whether it has a low performing radio branch or not.

In some aspects regular test periods are defined, typically during periods of time where little impact on regular network operation is expected (such as during periods of time where there is little or no scheduled traffic), e.g. night-time. Hence, according to an embodiment the reference signal is transmitted at regular time intervals.

In some aspects the radio branch testing is event triggered. The radio transceiver device 200a might then need to obtain some kind of indication in order for the radio transceiver device 200a to test whether it has a low performing radio branch or not. Hence, according to an embodiment the radio transceiver device 200a is configured to perform (optional) step S102:

S102: The radio transceiver device 200a obtains an indication.

The reference signal might then be transmitted, as in step S104, in response to the radio transceiver device 200a having obtained the indication. Further, when to transmit the reference signal, and/or to which another radio transceiver device 200b to transmit the reference signal might then be based on the indication.

There could be different types of indications as obtained in step S102.

According to an example the radio transceiver device 200a obtains an indication that network performance for the so-called another radio transceiver device 200b is above a network performance threshold value. That the network performance is above the network performance threshold value indicates that the so-called another radio transceiver device 200b is in favourable radio conditions. In this respect, the favorable radio condition might, for example, be defined by the so-called another radio transceiver device 200b being in a region having good network coverage. This might, as an example, be identified based on channel quality reports, e.g. good CQIs or high reference signal received power (RSRP) values.

According to an example the radio transceiver device 200a obtains an indication that Doppler spread for a radio propagation channel between the radio transceiver device 200a and the so-called another radio transceiver device 200b is below a Doppler spread threshold value. In this respect, low Doppler spread indicates that the testing can be performed during a comparatively long time under similar testing conditions. It also means that if the so-called another radio transceiver device 200b is in a deep fading dip it will remain there for a considerably long time.

According to an example the radio transceiver device 200a obtains an indication that downlink performance for the radio transceiver device 200a is below a downlink performance threshold value. This enables downlink KPIs to be monitored.

According to an example the radio transceiver device 200a obtains an indication that uplink performance in one of the radio branches is more than an uplink performance threshold value worse than the uplink performance in another of the radio branches. This enables uplink KPIs to be monitored. In this respect, poor quality of a measured uplink radio branch relative all other measured uplink radio branches might give an indication that there might be a low performing uplink radio branch.

Thus, when the radio transceiver device 200a detects decreasing KPIs, this triggers the radio transceiver device 200a to start testing whether it has a low performing radio branch or not.

Aspects of configuring the reference signals will now be disclosed.

There could be different types of reference signals that are transmitted in step S104. According to non-limiting examples each reference signal is any of a channel state information reference signal (CSI-RS), a (dedicated) reference signal for radio branch probing, or a (dedicated) reference signal for radio branch testing. In some aspects as many CSI-RS resources as there are radio branches are allocated in a discovery reference signal (DRS). Further, a zero-power reference signal might be either alternatingly or simultaneously transmitted with the reference signal in each radio branch.

Figure 6:
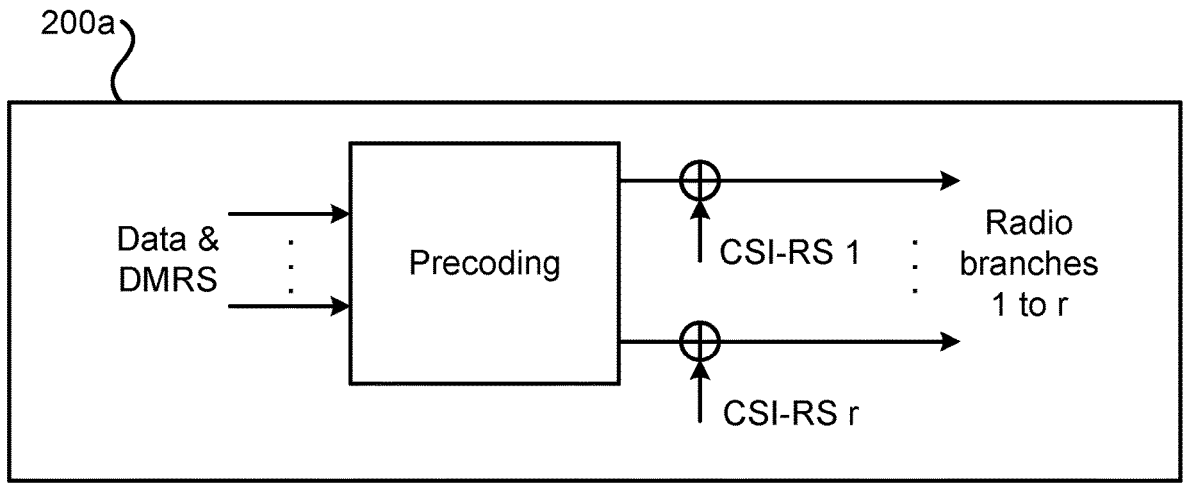
Figure 7:
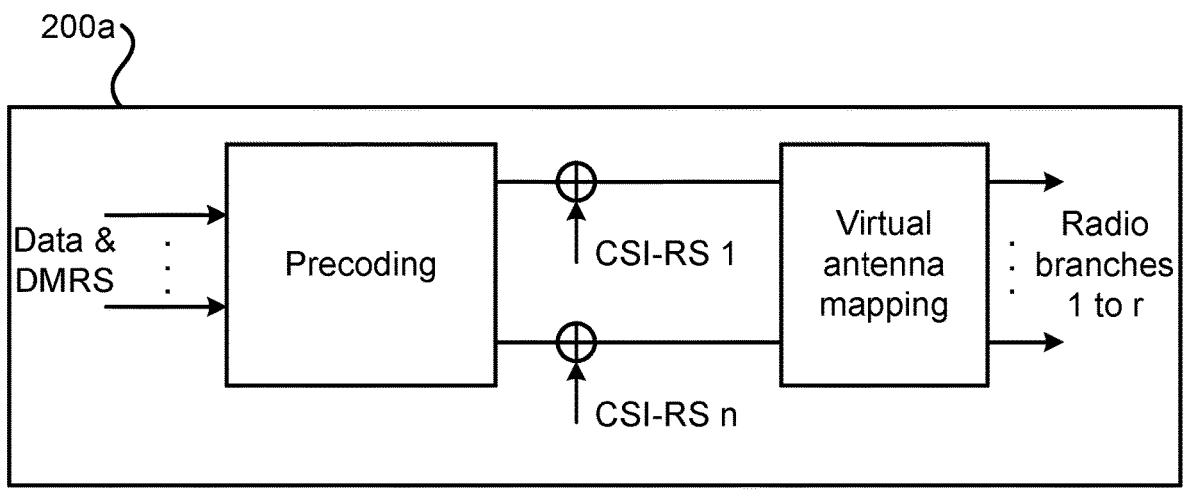

As an example, consider the configuration for transmitting signals illustrated in FIG. 6. Only one of the CSI-RSs 1, . . . , r at the time would be transmitted, while all other CSI-RSs are zero. For example, at time instant $t_1$, $CSI-RS_1$ is transmitted and all other CSI-RSs are zero, at time instant $t_2$ $CSI-RS_2$ is transmitted and all other CSI-RSs are zero, etc. Similarly, by considering the configuration for transmitting signals illustrated in FIG. 7, one CSI-RS (n=1) can be configured, and a virtual antenna mapping can be selected such that during each test period the CSI-RS is mapped to one of the r radio branches. That is, when testing radio branch l, the CSI-RS is only transmitted from radio branch l. Mathematically the precoder vector will be all zeros except a 1 at the l:th position. This will be disclosed in more detail in examples that follow below.

DRS can be used to configure a radio transceiver device 200b to report RSRP reports on up to 96 CSI-RS resources.

Hence, by allocating as many CSI-RS resources in the discovery signal as there are radio branches and ensuring that each CSI-RS is mapped to a single radio branch, the radio transceiver device 200a will get quality reports associated with each radio branch. An advantage with this approach is that it has a very small impact on normal operation, simultaneous scheduling of data.

An alternative to use DRS is to trigger several traditional RSRP reports, where for each report the reference signal used by the so-called another radio transceiver device 200b to estimate RSRP is associated with a single, and different, radio branch. This approach could require a comparatively high amount of RRC signaling in order to trigger all reports. This could be avoided by configuring a periodic report.

In this respect, the radio transceiver device 200a might configure CSI-RS resource for RSRP reporting (e.g. beam management). That is, where the radio transceiver device 200a configures one or more CSI-RS resources (each with one or several antenna ports), and let the radio transceiver device 200b report RSRP associated with the CSI-RS resources. One advantage from the perspective of the radio transceiver device 200b is that the radio transceiver device 200b is enabled to perform comparably simple processing (such as only power measurements) and does not need to determine values of CQI, Rank Indicator (RI), or Pre-coding Matrix Indicator (PMI). Further, this enables the radio transceiver device 200a to directly obtain a relevant signal to noise ratio (SNR) quality for the reference signal reported.

Further, the radio transceiver device 200a might be configured to transmit the reference signal such that each re-mapping of the reference signal to the radio branches is enough separated in time to ensure that the same mapping is used during the entire time the so-called another radio transceiver device 200b measures on, and processes, a reference signal of a particular radio branch.

Aspects of the reports received from the so-called another radio transceiver device 200b in step S108 will now be disclosed.

According to an embodiment the at least one report is indicative of measurements of the reference signals, and wherein the measurements are at least one of: measurements of received power, CQI measurements, zero-power CQI measurements, and frequency-selective CQI measurements.

In some aspects the radio transceiver device 200a configures the so-called another radio transceiver device 200b regarding how to measure the reference signal, and/or how to report the measurements. Particularly, according to an embodiment the radio transceiver device 200a is configured to perform (optional) step S104:

S104: The radio transceiver device 200a transmits configuration information to the so-called another radio transceiver device 200b. The configuration information specifies how the so-called another radio transceiver device 200b is to measure the reference signal, and/or how the so-called another radio transceiver device 200b is to report the measurements made by the so-called another radio transceiver device 200b on the reference signal.

In some aspects the so-called another radio transceiver device 200b will estimate the channel for all CSI-RSs associated with the configured antenna ports and from all those estimates form one precoded CQI (per codeword) that is reported. As an example, assume that the so-called another radio transceiver device 200b is configured to report CQI based on 8 reference signals. Since, during the testing the radio branches at the radio transceiver device 200a, the radio transceiver device 200a will set the weight factors for all reference signals except one to zero (say, the weight factors for reference signals 1 to 7 are zero whilst being set to one for reference signal 8), the estimates made by the radio transceiver device 200b of reference signals 1-7 will be significantly lower (noise estimate) than for reference signal 8 (assuming that the radio branch for reference signal 8 is not faulty). Hence, combining all 8 reference signals will essentially be the same as using only reference signals 8. Thus, reporting the combined CQI essentially means reporting the quality of the radio branch currently associated with the non-zero reference signal.

In this approach, each CQI gives an instantaneous report of the channel quality associated with a single radio branch. To obtain sufficient statistics, several CQI reports associated with each radio branch might be needed. One way is to use wideband CQI and/or measure repeatedly over time with the same mapping between reference signals and radio branches. If reports are received from two or more radio transceiver devices 200b, 200c to get more statistics, but in this case, these radio transceiver devices 200b, 200c might experience different long-term statistics (different QCL properties).

The approach described here is applicable both for so-called Type-A CQI reporting and so-called Type-B CQI reporting. For Type-A, the same reference signal to radio branch mapping is used during the period the radio transceiver devices 200b measures and creates one CQI report. For Type-B one or several non-zero power CSI-RS resources having one antenna port can be configured, in which case the report directly will reflect the quality of the associated radio branch.

When the measurements and reporting is performed by radio transceiver devices 200b supporting up to Rel-10 of the Long Term Evolution (LTE) standard, the radio transceiver device 200b will measure on this CSI-RS resource, and hence several reports on each reference signal might be obtained which can be used to increase the quality of the measurement. Further, according to Rel-13 of the LTE standard the radio transceiver device 200b will only feedback CSI related to one CSI-RS resource (e.g. the best one). According to later releases of the LTE standard the radio transceiver device 200b might be configured to report CSI related to more than one CSI-RS resource. In this latter case, two non-zero CSI-RS resources could be configured per antenna port, where one CSI-RS resource is used for the testing (i.e. during each test time the CSI-RS resource is associated with only one radio branch) and nothing is transmitted using the other CSI-RS resource (cf. zero-power reference signals). By comparing the reported CQI associated with the two CSI-RS resources the radio transceiver device 200a will obtain a relative comparison of the quality of the radio branch as-is and what would be the quality if the radio branch was switched off. If the two qualities are similar the radio transceiver device would deem the radio branch as low performing.

Aspects of identifying which of the at least some of the N radio branches is the low performing one will now be disclosed. Particularly, according to an embodiment the radio transceiver device 200a is configured to perform any of (optional) steps S110a, S110b, and S110c as part of identifying which of the at least some of the N radio branches is the low performing one.

S110a: The radio transceiver device 200a determines, from the at least one report and when the measurements are of received power of the reference signal, that the reference signal transmitted for the identified radio branch has lower received power than the reference signal transmitted for each of the remaining radio branches.

In this respect, if the quality of a particular radio branch is significantly lower than the average quality of all (Quasi Co-Located—QCL) radio branches, then this particular radio branch is identified as low performing. As a non-limiting illustrative example, let $\gamma_{k,j}$ be the quality of radio branch k divided by the quality of j QCL radio branches. Here QCL implies that same or at least similar long-term radio propagation channel characteristics can be assumed for all quality measurements. Then $\gamma_{k,j}$ can be averaged over different sets of j QCL radio branches if the resulting $\gamma_k$ is smaller than a threshold, then radio branch k is identified as low performing. The threshold is typically determined to be below a certain false alarm rate. Alternatively, or in combination, the quality of a radio branch obtained by probing can be compared with the normalized beamformed CQI obtained from normal operation. Here normalization means removing the nominal beamforming gain.

S110b: The radio transceiver device 200a compares, when a first report pertaining to a non zero-power reference signal and a second report pertaining to a zero-power reference signal are received for the at least some of the N radio branches, the first report and the second report for the at least some of the N radio branches. Depending on configuration, the first and second reports might be simultaneously received or not.

In more detail, two reports can be created for each radio branch; one for a zero-power reference signal and one for a normal-power reference signal. This enables the quality of each radio branch relative the corresponding zero-power quality to be determined. In this respect, if the radio branch is low performing, the report of the zero-power reference signal and the report of the normal-power reference signal would be similar; otherwise the CQI reported for the normal-power reference signal will be significantly higher than for the zero-power reference signal. Alternatively, this can be achieved by, for each reference signal to radio branch mapping, obtain two reports; one for normal operation and one where the power amplifier for the radio branch switched off. One advantage of this approach is that properties (QCL, long-term and short-term) are similar between the different measurements, making it more robust/reliable to assess the quality of a specific radio branch based on these measurements. Further, for frequency-selective CQI reporting the quality for several radio branches can be obtained in one single report, making a relative comparison straightforward.

S110c: The radio transceiver device 200a combines, when at least one further report is received from yet another radio transceiver device 200c relating to measurements made by this yet another radio transceiver device 200c on the reference signal transmitted for the at least some of the N radio branches, the at least one report from the so-called another radio transceiver device 200b and the at least one report from this yet another radio transceiver device 200c.

In more detail, the measurements as provided in two or more different reports can be combined (averaged) to remove small scale effects, such as fast fading, and thereby increase accuracy. As an example, averaging might be used between measurements with similar properties (such as for QCL radio branches), whereas when averaging measurements with potentially different QCL properties the respective measurements might first be averaged.

Aspects of actions the radio transceiver device 200a might perform when having identified the low performing radio branch will now be disclosed.

In some aspects the low performing radio branch is switched off. Particularly, according to an embodiment the radio transceiver device 200a is configured to perform (optional) step S112a:

S112a: The radio transceiver device 200a switches off the identified radio branch.

In some aspects beamforming weight factors are recalculated when one or more of the radio branches are switched off. Particularly, according to an embodiment each radio branch is associated with a respective weight factor for transmitting the reference signal and the radio transceiver device 200a is configured to perform (optional) step S114a:

S114a: The radio transceiver device 200a determines a new respective weight factor for each of the remaining radio branches.

In particular, this might be the case for wide beams used to define the region, or so-called cell, in which the radio transceiver device 200a provides network coverage. These weight factors might be more sensitive to a low performing radio branch than the general data precoding which usually has a codebook consisting of a wide set of precoding weights.

In further detail, a new mapping of weight factors to CSI-RS might be determined by transmitting the reference signal in different instance of time for each of the at least some of the radio branches.

Assume, for non-limiting and illustrative purposes, that the radio transceiver device 200a has 8 (transmit) radio branches with 4 antenna ports, as in FIG. 3, and that Rank 3 transmission is used. Assume further that measuring the reference signal on antenna port 4 results in a very poor channel state report (CSI-RS$_4$) for reference signal 4 (RS$_4$).

In order for the radio transceiver device 200a to identify radio branch TX3 as being low performing, in the first instance of time the radio transceiver device 200a sets only the weight factor (w25 in the example of FIG. 3) for TX1 whilst setting all other weight factors for the other radio branches TX2, . . . , TX8 to zeros. Thus, for RS$_4$ at time instance t1 the weight factors w25-w32 are set to:

$$\begin{bmatrix} w25 \\ 0 \\ 0 \\ 0 \\ 0 \\ 0 \\ 0 \\ 0 \end{bmatrix}$$

Depending on the received CSI-RS$_4$ the radio transceiver device 200a checks if the measurements in the Channel State Report for Reference Signal 4 are acceptable or poor for radio branch TX1.

The radio transceiver device 200a will then continue with testing and checking the next radio branch TX2 for CSI-RS$_4$ in the next time instance t2 by setting only the weight factor (w26 in the example of FIG. 3) for TX2 whilst setting all other weight factors for the other radio branches TX1, TX3, . . . , TX8 to zeros. Thus, for RS$_4$ at time instance t2 the weight factors w25-w32 are set to:

$$\begin{bmatrix} 0 \\ w26 \\ 0 \\ 0 \\ 0 \\ 0 \\ 0 \\ 0 \end{bmatrix}$$

Again, the radio transceiver device 200a checks if the measurements in the channel state report for RS$_4$ are acceptable or poor for radio branch TX2.

The radio transceiver device 200a repeats this process for all radio branches TX3, . . . , TX8 in order to determine which of the radio branches TX1, . . . , TX8 that causes the poor CSI-RS. In the example above and as illustrated in FIG. 3 it is radio branch TX3 that is corrupted, or has some faulty radio component that causes the poor CSI-RS$_4$.

When the low-performing radio chain has been identified, the low-performing radio chain is excluded. In the example of FIG. 2, the Digital Unit DU will switch of the radio branch TX3 for example by switching off DPD3 and PA3, which will save power and improve the power amplifiers cooling. Consequently, the new weight factors w25-w32 for RS$_4$ will be:

$$\begin{bmatrix} w25 \\ w26 \\ 0 \\ w28 \\ w29 \\ w30 \\ w31 \\ w32 \end{bmatrix}$$

The same steps might be performed for RS$_1$, RS$_2$ and RS$_3$.

In some aspects the radio transceiver device 200a notifies any other radio transceiver devices 200b, 200c about the new weight factors. Hence, according to an embodiment the radio transceiver device 200a is configured to perform (optional) step S116a:

S116a: The radio transceiver device 200a transmits configuration information to the so-called another radio transceiver device 200b about the new weight factors having been determined.

In some aspects the identified radio branch is only temporarily switched off and then switched on again. Particularly, according to an embodiment the radio transceiver device 200a is configured to perform (optional) step S112b:

S112b: The radio transceiver device 200a temporarily switches off at least the identified radio branch during a predetermined amount of time after having identified the radio branch and then switching the identified radio branch on again.

In scenarios where the radio branch is low performing because of overheating, this could thus enable the identified radio branch to cool down in temperature before being switched on for operations.

In some aspects there is reciprocity between transmission and reception. That is, if a radio branch used for transmission is low performing, then also a corresponding radio branch used for reception is low performing, and vice versa.

Particularly, in some aspects the radio transceiver device 200a comprises (separate) transmit radio branches and receive radio branches, where each respective transmit radio branch is paired with a respective one of the receive radio branches, and where the identified radio branch is a transmit radio branch. According to an embodiment the radio transceiver device 200a is then configured to perform (optional) step S118:

S118: The radio transceiver device 200a switches off the receive radio branch paired with the identified radio branch.

This could ensure that corresponding receive radio branch is not used when forming downlink channel estimates based on uplink sounding measurements for downlink beamforming.

In some aspects the radio transceiver device 200a re-evaluates the identified radio branch. Particularly, according to an embodiment the radio transceiver device 200a is configured to perform (optional) step S120:

S120: The radio transceiver device 200a repeats, without switching off the identified radio branch and only for the identified radio branch, the transmitting in step S106, the receiving in step S108, and the identifying in step S110 in order to re-evaluate if the identified radio branch still is to be switched off.

Thereby, the radio transceiver device 200a might identify partly faults, such as loose connections in the radio branches or loosely fitted components of the radio branches, or find radio branches that are erroneously deemed faulty. Further, re-evaluating if the identified radio branch still is to be switched off enables the radio transceiver device 200a to use reports from different radio transceiver devices 200b, 200c to confirm that there is a low performing radio branch.

In general terms, an antenna port might not correspond to a physical antenna, but is rather a logical entity distinguished by having its own reference signal sequences. Hence, separate reference signals can be defined for each antenna port. The physical radio propagation channels seen from different antenna ports should preferably not interfere with each other. This could be accomplished by having different reference signal sequences with good cross-correlation properties, and by separating antenna ports in frequency, time or code (so-called cover-codes are used to make the antenna ports mutually orthogonal).

In particular, according to an embodiment the reference signal is transmitted from antenna ports, where the radio transceiver device 200a comprises more radio branches than antenna ports, and the radio branches are mapped to the antenna ports via a distribution network. According to an embodiment the reference signal is associated with a specific one of the antenna ports, and wherein the reference signal is alternatingly transmitted from each of the radio branches available for this specific antenna port.

There could be different reasons for the identified radio branch to have low performance. According to an embodiment the low performing radio branch is faulty. According to another embodiment the low performing radio branch is associated with transmission of the reference signal in a radio propagation channel suffering from deep fading. The identified radio branch might then be switched off to save transmission power without negatively affecting other network KPIs. An example where the radio transceiver device 200a experiences a radio propagation channel suffering from deep fading One example of the latter could be when the radio propagation channel experiences deep fading during a long period, something that might occur in static scenarios, e.g. where the radio transceiver device 200a is used for a fixed wireless access (FWA) system or used for a back/fronthaul application.

Figure 8:
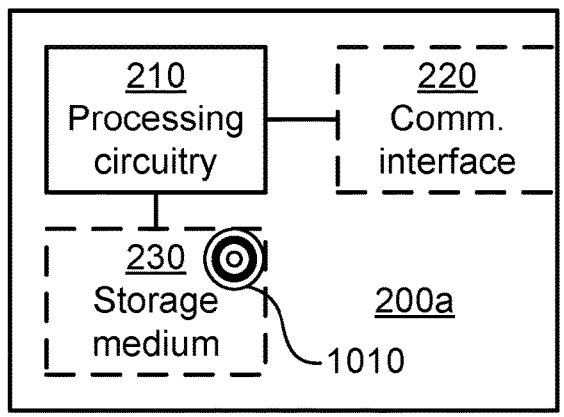
FIG. 8 is a schematic diagram showing functional units of a radio transceiver device according to an embodiment.

FIG. 8 schematically illustrates, in terms of a number of functional units, the components of a radio transceiver device 200a according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1010 (as in FIG. 10), e.g. in the form of a storage medium 230. The processing circuitry 210 may further be provided as at least one application specific integrated circuit (ASIC), or field programmable gate array (FPGA).

Particularly, the processing circuitry 210 is configured to cause the radio transceiver device 200a to perform a set of operations, or steps, as disclosed above. For example, the storage medium 230 may store the set of operations, and the processing circuitry 210 may be configured to retrieve the set of operations from the storage medium 230 to cause the radio transceiver device 200a to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The radio transceiver device 200a may further comprise a communications interface 220 at least configured for communications with other entities, nodes, functions, and devise of the communications network 100, such as other radio transceiver devices 200b, 200c. As such the communications interface 220 may comprise one or more transmitters and receivers, comprising analogue and digital components.

The processing circuitry 210 controls the general operation of the radio transceiver device 200a e.g. by sending data and control signals to the communications interface 220 and the storage medium 230, by receiving data and reports from the communications interface 220, and by retrieving data and instructions from the storage medium 230. Other components, as well as the related functionality, of the radio transceiver device 200a are omitted in order not to obscure the concepts presented herein.

Figure 9:
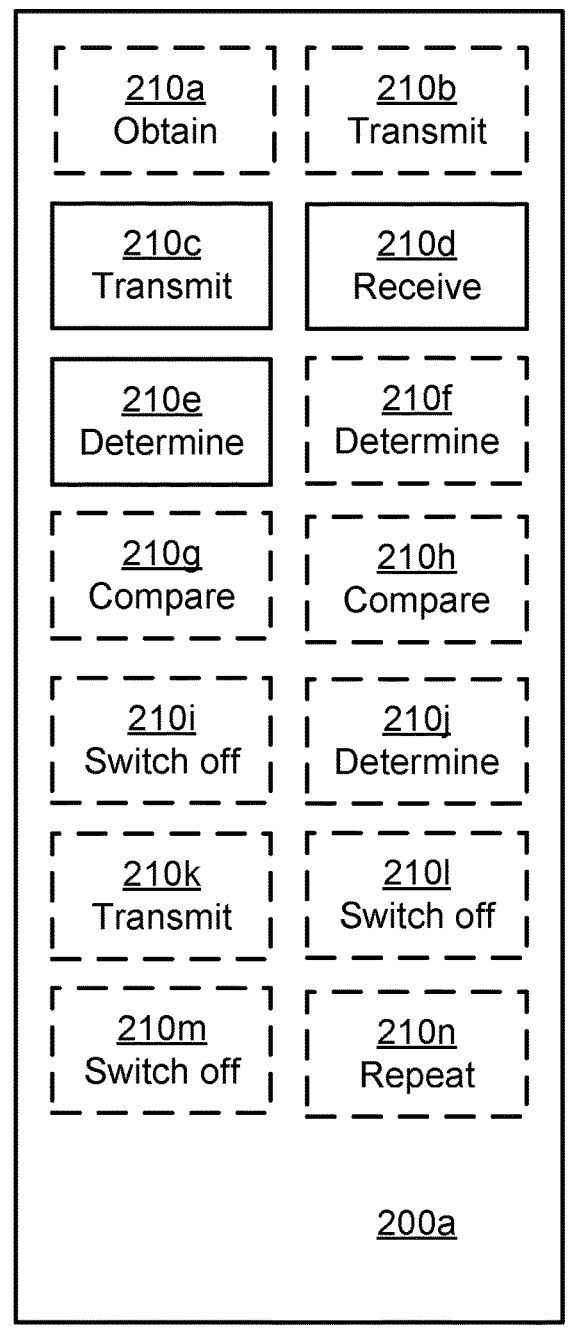
FIG. 9 is a schematic diagram showing functional modules of a radio transceiver device according to an embodiment.

FIG. 9 schematically illustrates, in terms of a number of functional modules, the components of a radio transceiver device 200a according to an embodiment. The radio transceiver device 200a of FIG. 9 comprises a number of functional modules; a transmit module 210c configured to perform step S106, a receive module 210d configured to perform step S108, and a determine module 210e configured to perform step S110.

The radio transceiver device 200a of FIG. 9 may further comprise a number of optional functional modules, such as any of an obtain module 210a configured to perform step S102, a transmit module 210b configured to perform step S104, a determine module 210f configured to perform step S110a, a compare module 210g configured to perform step S110b, a compare module 210h configured to perform step S110c, a switch off module 210i configured to perform step S112a, a determine module 210j configured to perform step S114a, a transmit module 210k configured to perform step S116a, a switch off module 210l configured to perform step S112a, a switch off module 210m configured to perform step S118, and a repeat module 210n configured to perform step S120.

In general terms, each functional module 210a-210n may in one embodiment be implemented only in hardware and in another embodiment with the help of software, i.e., the latter embodiment having computer program instructions stored on the storage medium 230 which when run on the processing circuitry makes the radio transceiver device 200a perform the corresponding steps mentioned above in conjunction with FIG. 5. It should also be mentioned that even though the modules correspond to parts of a computer program, they do not need to be separate modules therein, but the way in which they are implemented in software is dependent on the programming language used. Preferably, one or more or all functional modules 210a-210n may be implemented by the processing circuitry 210, possibly in cooperation with the communications interface 220 and/or the storage medium 230. The processing circuitry 210 may thus be configured to from the storage medium 230 fetch instructions as provided by a functional module 210a-210n and to execute these instructions, thereby performing any steps as disclosed herein.

The radio transceiver device 200a may be provided as a standalone device or as a part of at least one further device. For example, the radio transceiver device 200a may be provided in a node of the radio access network or in a node of the core network. Alternatively, functionality of the radio transceiver device 200a may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cell than instructions that are not required to be performed in real time.

Thus, a first portion of the instructions performed by the radio transceiver device 200a may be executed in a first device, and a second portion of the of the instructions performed by the radio transceiver device 200a may be executed in a second device; the herein disclosed embodiments are not limited to any particular number of devices on which the instructions performed by the radio transceiver device 200a may be executed. Hence, the methods according to the herein disclosed embodiments are suitable to be performed by a radio transceiver device 200a residing in a cloud computational environment. Therefore, although a single processing circuitry 210 is illustrated in FIG. 8 the processing circuitry 210 may be distributed among a plurality of devices, or nodes. The same applies to the functional modules 210a-210n of FIG. 9 and the computer program 1020 of FIG. 10 (see below).

Figure 10:
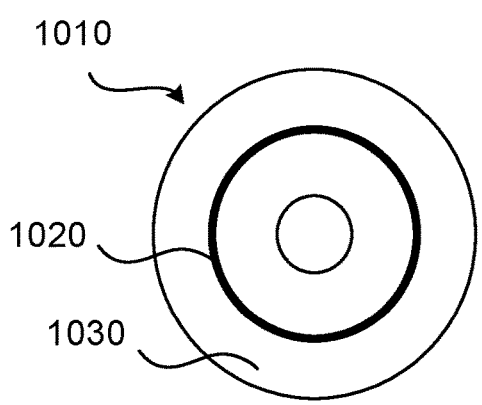
FIG. 10 shows one example of a computer program product comprising computer readable storage medium according to an embodiment.

FIG. 10 shows one example of a computer program product 1010 comprising computer readable storage medium 1030. On this computer readable storage medium 1030, a computer program 1020 can be stored, which computer program 1020 can cause the processing circuitry 210 and thereto operatively coupled entities and devices, such as the communications interface 220 and the storage medium 230, to execute methods according to embodiments described herein. The computer program 1020 and/or computer program product 1010 may thus provide means for performing any steps as herein disclosed.

In the example of FIG. 10, the computer program product 1010 is illustrated as an optical disc, such as a CD (compact disc) or a DVD (digital versatile disc) or a Blu-Ray disc. The computer program product 1010 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1020 is here schematically shown as a track on the depicted optical disk, the computer program 1020 can be stored in any way which is suitable for the computer program product 1010.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for identifying a faulty radio branch at a radio transceiver device comprising N radio branches, wherein the N radio branches transmit radio transmissions via an antenna system having a plurality of antenna arrays, each antenna array having a plurality of dual-polarized antenna elements, the method comprising:

transmitting a reference signal in a radio transmission for at least some of the N radio branches in a respective test period to another radio transceiver device via the antenna system, wherein the reference signal in each test period is transmitted according to a test configuration, and wherein the test configuration specifies that during each test period the reference signal is mapped to only one of the N radio branches such that in test period k, where k=1, . . . , N, the reference signal is only transmitted from radio branch k;

in response to transmitting the reference signal, receiving at least one report from said another radio transceiver device relating to measurements made by said another radio transceiver device on the reference signal transmitted for said at least some of the N radio branches; and in response to receiving the at least one report, identifying which of the N radio branches is faulty by mapping information of the measurements in the at least one report to the test configuration.

2. The method according to claim 1, wherein only one single reference signal is transmitted during each test period.

3. The method according to claim 1, wherein there are simultaneous transmissions of more than one reference signal, each of which being mapped to a corresponding one of the radio branches.

4. The method according to claim 3, wherein each reference signal is transmitted in its own frequency sub-band.

5. The method according to claim 1, wherein the reference signal is transmitted at regular time intervals.

6. The method according to claim 1, further comprising:
obtaining an indication of at least one of:
network performance for said another radio transceiver device being above a network performance threshold value,
Doppler spread for a radio propagation channel between the radio transceiver device and said another radio transceiver device being below a Doppler spread threshold value,
downlink performance for the radio transceiver device being below a downlink performance threshold value, and uplink performance in one of the radio branches being more than an uplink performance threshold value worse than the uplink performance in another of the radio branches, and wherein the reference signal is transmitted in response to having obtained the indication, wherein when to transmit the reference signal is based on the indication, or to which another radio transceiver device to transmit the reference signal is based on the indication, or both when to transmit the reference signal is based on the indication and to which another radio transceiver device to transmit the reference signal is based on the indication.

7. The method according to claim 1, wherein each reference signal is any of a channel state information reference signal (CSI-RS), a reference signal for radio branch probing, or a reference signal for radio branch testing.

8. The method according to claim 7, wherein as many CSI-RS resources as there are radio branches are allocated in a discovery reference signal (DRS).

9. The method according to claim 1, wherein a zero-power reference signal is alternatingly or simultaneously transmitted with the reference signal in each radio branch.

10. The method according to claim 1, wherein the at least one report is indicative of measurements of the reference signals, and wherein the measurements are at least one of: measurements of received power, channel quality indicator (CQI) measurements, zero-power CQI measurements, and frequency-selective CQI measurements.

11. The method according to claim 1, further comprising: transmitting configuration information to said another radio transceiver device, wherein the configuration information specifies at least one of: how said another radio transceiver device is to measure the reference signal, and how said another radio transceiver device is to report the measurements made by said another radio transceiver device on the reference signal.

12. The method according to claim 1, wherein identifying which of said at least some of the N radio branches is the faulty radio branch comprises at least one of:
determining, from the at least one report and when the measurements are of received power of the reference signal, that the reference signal transmitted for the identified radio branch has lower received power than the reference signal transmitted for each of the remaining radio branches;
comparing, when a first report pertaining to a non zero-power reference signal and a second report pertaining to a zero-power reference signal are received for said at least some of the N radio branches, the first report and the second report for said at least some of the N radio branches; and
combining, when at least one further report is received from yet another radio transceiver device relating to measurements made by said yet another radio transceiver device on the reference signal transmitted for said at least some of the N radio branches, the at least one report from said another radio transceiver device and the at least one report from said yet another radio transceiver device.

13. The method according to claim 1, wherein each radio branch is associated with a respective weight factor for transmitting the reference signal, the method further comprising:
switching off the identified radio branch; and
determining a new respective weight factor for each of the remaining radio branches.

14. The method according to claim 13, further comprising:
transmitting configuration information to said another radio transceiver device about the new weight factors having been determined.

15. The method according to claim 1, further comprising:
temporarily switching off at least the identified radio branch during a predetermined amount of time after having identified the radio branch and then switching the identified radio branch on again.

16. The method according to claim 1, wherein the radio transceiver device comprises transmit radio branches and receive radio branches, and wherein each respective transmit radio branch is paired with a respective one of the receive radio branches, and wherein the identified radio branch is a transmit radio branch, the method further comprising:
switching off the receive radio branch paired with the identified radio branch.

17. The method according to claim 1, further comprising:
repeating, without switching off the identified radio branch and only for the identified radio branch, said transmitting, said receiving, and said identifying, in order to re-evaluate if the identified radio branch still is to be switched off.

18. A radio transceiver device for identifying a faulty radio branch at the radio transceiver device, wherein the radio transceiver device comprising N radio branches and wherein the N radio branches transmit radio transmissions via an antenna system having a plurality of antenna arrays, each antenna array having a plurality of dual-polarized antenna elements, the radio transceiver device comprising:
a processing circuitry; and
a memory containing instruction which, when executed by the processing circuitry, cause the radio transceiver device to:
transmit a reference signal in a radio transmission for at least some of the N radio branches in a respective test period to another radio transceiver device via the antenna system, wherein the reference signal in each test period is transmitted according to a test configuration, and wherein the test configuration specifies that during each test period the reference signal is mapped to only one of the N radio branches such that in test period k, where k=1, . . . , N, the reference signal is only transmitted from radio branch k;
in response to transmission of the reference signal, receive at least one report from said another radio transceiver device relating to measurements made by said another radio transceiver device on the reference signal transmitted for said at least some of the N radio branches; and
in response to reception of the at least one report, identify which of the N radio branches is faulty by mapping information of the measurements in the at least one report to the test configuration.

19. The radio transceiver device according to claim 18, wherein only one single reference signal is transmitted during each test period.

20. A non-transitory computer-readable storage medium comprising computer code which, when run on a processing circuitry of a radio transceiver device is capable of causing the radio transceiver device to identify a faulty radio branch at a radio transceiver comprising N radio branches, wherein the N radio branches transmit radio transmissions via an antenna system having a plurality of antenna arrays, each antenna array having a plurality of dual-polarized antenna elements, by performing operations comprising:

transmitting a reference signal in a radio transmission for at least some of the N radio branches in a respective test period to another radio transceiver device via the antenna system, wherein the reference signal in each test period is transmitted according to a test configuration, and wherein the test configuration specifies that during each test period the reference signal is mapped to only one of the N radio branches such that in test period k, where k=1, ..., N, the reference signal is only transmitted from radio branch k;

in response to transmitting the reference signal, receiving at least one report from said another radio transceiver device relating to measurements made by said another radio transceiver device on the reference signal transmitted for said at least some of the N radio branches; and in response to receiving the at least one report, identifying which of the N radio branches is faulty by mapping information of the measurements in the at least one report to the test configuration.

* * * * *